United States Patent [19]

Kawabata et al.

[11] Patent Number: 4,681,432
[45] Date of Patent: Jul. 21, 1987

[54] PHOTO-ELECTRIC CONVERTING DEVICE

[75] Inventors: Takashi Kawabata; Yuichi Sato; Tokuichi Tsunekawa; Susumu Matsumura, all of Kanagawa, Japan

[73] Assignee: Canon Kabushiki Kaisha, Tokyo, Japan

[21] Appl. No.: 595,242

[22] Filed: Mar. 30, 1984

[30] Foreign Application Priority Data

Apr. 1, 1983 [JP] Japan .................................. 58-57208
Jul. 12, 1983 [JP] Japan ............................... 58-126332
Jul. 12, 1983 [JP] Japan ............................... 58-126333

[51] Int. Cl.$^4$ .......................... G01C 3/08; G03B 3/00; G03B 3/18; H01J 40/14
[52] U.S. Cl. ..................................... 356/4; 354/403; 356/1; 250/214 B
[58] Field of Search ....................... 356/1, 4; 354/403; 250/201, 214 B

[56] References Cited

U.S. PATENT DOCUMENTS

| | | | |
|---|---|---|---|
| 3,937,574 | 2/1976 | Peckham et al. | 356/4 |
| 4,274,735 | 6/1981 | Tamura et al. | 354/403 |
| 4,295,740 | 10/1981 | Sturges, Jr. | 356/4 |
| 4,303,981 | 12/1981 | Kondo et al. | 356/4 |
| 4,429,967 | 2/1984 | Tokuda et al. | 356/4 |
| 4,490,036 | 12/1984 | Anagnostopoulos | 356/1 |
| 4,518,253 | 5/1985 | Takahashi | 356/4 |
| 4,521,106 | 6/1985 | Lambeth | 354/403 |

Primary Examiner—Stephen C. Buczinski
Assistant Examiner—Melissa L. Koltak
Attorney, Agent, or Firm—Toren, McGeady & Associates

[57] ABSTRACT

A photo-electric converting device includes storing parts which store electric charges obtained through a photo-electric conversion process respectively from reflected light received when light projection is performed by light emitting apparatus and another reflected light received when no light is projected by the light emitting apparatus. The device computes storage signals produced from the storing parts and detects an electric signal which corresponds solely to reflected light resulting from light projection performed by the light emitting apparatus.

4 Claims, 14 Drawing Figures

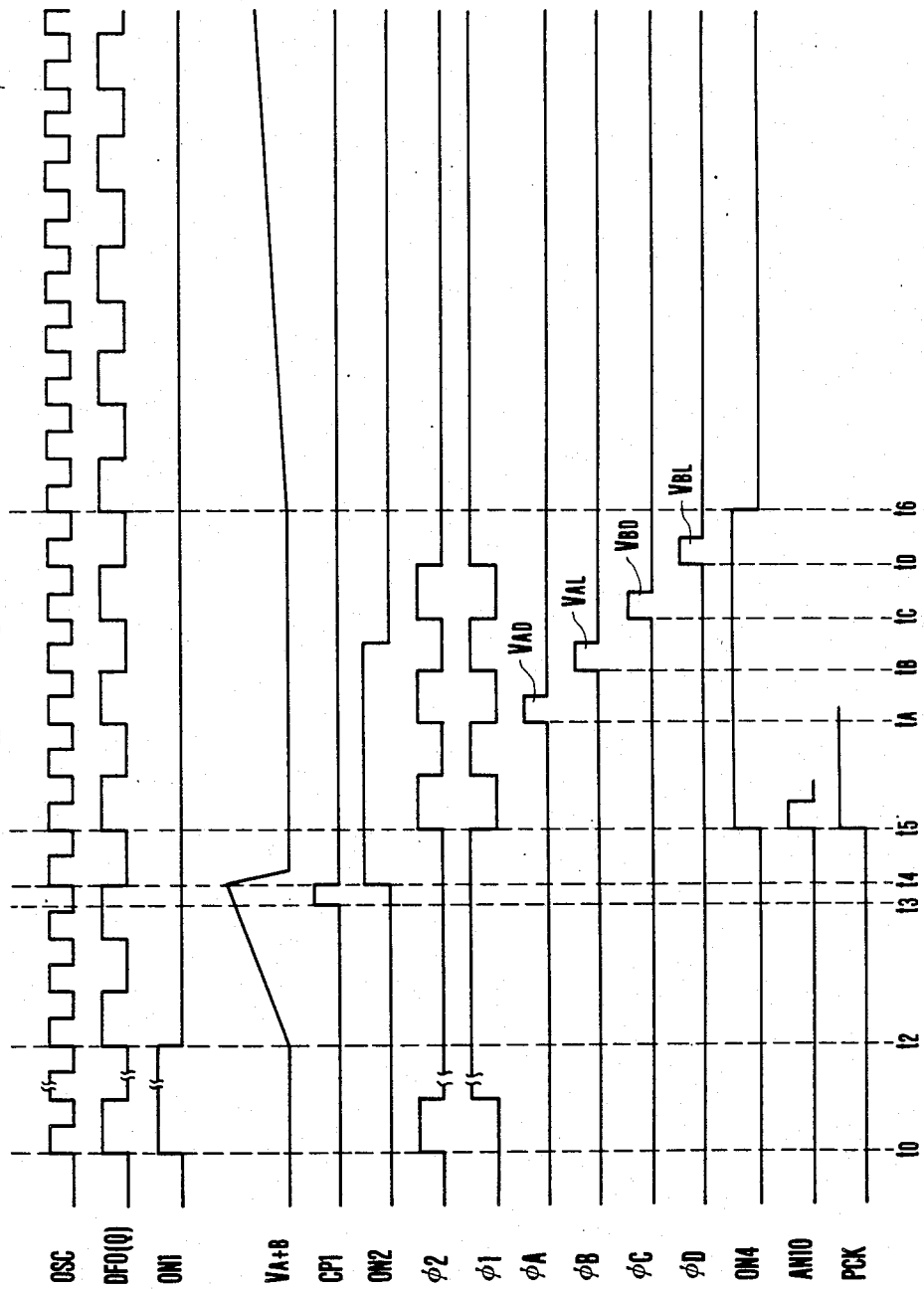

PHOTO-ELECTRIC CONVERTING DEVICE

BACKGROUND OF THE INVENTION

1. Field of the Invention

This invention relates to a photo-electric converting device used in a distance measuring device for measuring the distance to an object to be photographed or an object located at a specific spot.

2. Description of the Prior Art

There have been known distance measuring devices which to compute the distance to an object and the extent to which a photo-taking lens should be shifted for focusing it on the object to be photographed and to shift the photo taking lens to an in-focus position and stop it in that position.

Such a device includes therein a photo-electric converting device which receives the reflected light from the object to produce an electric charge quantity signal through a photo-electric conversion process and gives a distance measuring signal based on the electric charge quantity signal.

Heretofore, a highly sensitive and highly responsive photo-electric converting element has been employed as the above photo-electric converting element. Some of such devices discriminate a projected light from an external light through a synchronized integrating operation to statistically eliminate the influence of the external light and thus to take out only the reflected light component resulting from a light projecting operation. However, because of the scale of the synchronized integrating operation, the integrating arrangement cannot be made using the same IC as that of a photo-electric converting arrangement. As a result, such photo-electric converting elements have increased probability of noise generation due to the use of amplifiers, etc.

Furthermore, in storage type photo-electric converting elements using a CCD or the like in general, external light information other than effective information is also stored. Therefore, due to the limited dynamic range of the CCD employed, it has been impossible to obtain an adequate S/N ratio.

It is a first object of the present invention to provide a photo-electric converting device wherein light emitting means which emits and projects distance measuring light on a distance measuring or photography object which performs the light emitting action alternately with no light emitting action.

It is a second object of the invention to provide a photo-electric converting device which is of a simple structure and which facilitates use of an integrated circuit.

It is a third object of the invention to provide a photo-electric converting device which comprises photo-electric converting means which receives from an object reflected light resulting from a light projected by light emitting means continuously performing light emitting and another reflected light from the object resulting from sunlight or indoor illuminated light (or an external light).

It is a fourth object of the invention to provide a photo-electric converting device wherein there are provided a photo-electric converting part, a first storing part which stores an electrical signal representing a reflected light quantity received from the above object when light emitting is performed by the above light emitting means, a second storing part which stores an electrical signal representing a reflected light quantity received from the object when no light is emitted from the light emitting means, a computing part which computes storage signals produced from the first and second storing parts and produces a distance measurement signal therefrom, transfer gates which permit transfer of the storage signals from the storing parts to the computing part for the above computation and a gate control part which controls these gates; and wherein with the alternately repeating cycle of light emitting and no light emitting of the light emitting means utilized, reflected light at the time of light emission and another reflected light at the time of no light emission are received by the single photo-electric converting part; the photo-electric conversion signals obtained at these times are stored respectively at the first and second storing parts; and a reflection light component resulting solely from light emitting is obtained through computation.

The general and common objective of the first through fourth objects of the invention is to provide a device wherein there is provided one photo-electric converting part.

A fifth object of the invention is to provide a photo-electric converting device wherein a photo-electric converting part receiving an incident light is divided into first and second parts.

These and further objects and features of the invention will become apparent from the detailed description of preferred embodiments thereof taken in conjunction with the accompanying drawings.

SUMMARY OF THE INVENTION

To attain the first object of the invention, when the light is thus emitted, a reflected light is received from the object including a reflected light component resulting from light emitted by the light emitting means and another reflected light component resulting from ambient light such as sunlight or indoor illumination light. When the light is not emitted, reflected light, which results solely from ambient light, is also received from the object. The difference between the reflected light quantity received when the light is emitted and that of the reflected light received when no light is emitted is obtained and a distance measurement signal with an excellent S/N ratio without noise is thus obtained.

To attain the second object, the photo-electric converting device is such that the above light emitting means alternately repeats light emitting action and no light emitting action. A photo-electric converting part stores, at a first storing part, an information value obtained by photo-electrically converting reflected light including the light components, one resulting from the light emitted from the light emitting means and another from ambient light under the light emitting action. Another photo-electric converting part stores, at a second storing part, an information value obtained by photo-electrically converting reflected light resulting solely from the ambient light when no light is being emitted.

To attain the third object of the invention a single storing means consists of a storing part which stores a photo-electric conversion signal coming from the photo-electric converting means when light emitting is performed by the light emitting means and another storing part which stores a photo-electric conversion signal coming from the photo-electric converting means when no light emitting action is performed by the light emitting means. A switch-over arrangement shifts input gates from one to another for the storing means between its conditions of light emitting and not light emitting and thus permits simplification of the structural arrangement of the storing means.

The first through fourth objects of the invention are attained with photo-electrically converted signals when a light is emitted from the light emitting means and when no light is emitted from the light emitting means are stored respectively at the first and second storing parts. A distance measurement signal is obtained by computing signals produced from the first and second storing parts.

To attain the fifth object of the invention first and second signal storing parts store signals photo-electrically converted by the first and second photo-electric converting parts when a light is emitted from light emitting means. Third and fourth signal storing parts store signals photo-electrically converted by the first and second photo-electric converting parts when no light is emitted from the light emitting means. Signals produced from the first through fourth signal storing parts are subjected to addition and subtraction to detect a signal representing a reflected light component resulting solely from light emission performed by the light emitting means, so that the accuracy of distance measurement can be enhanced.

BRIEF DESCRIPTION OF THE DRAWINGS

FIGS. 1 through 5 show a first group of embodiments of the present invention and FIGS. 6(a) through 11 show a second group of embodiments.

FIGS. 1, 2, 3, 4 and 5 are circuit diagrams showing the circuit arrangement of the first group of embodiments.

FIGS. 6(a), 6(b) and 6(c) are illustrations showing the concept of the second group of embodiments.

FIG. 7 is a schematic of the structural arrangement of the photo-electric converting element of the embodiments.

FIGS. 8A and 10 are circuit diagrams showing circuits which to process the gate signals and output signals of the photo-electric converting element.

FIGS. 9 and 11 are timing charts.

DETAILED DESCRIPTION OF PREFERRED EMBODIMENTS

Figure 1:
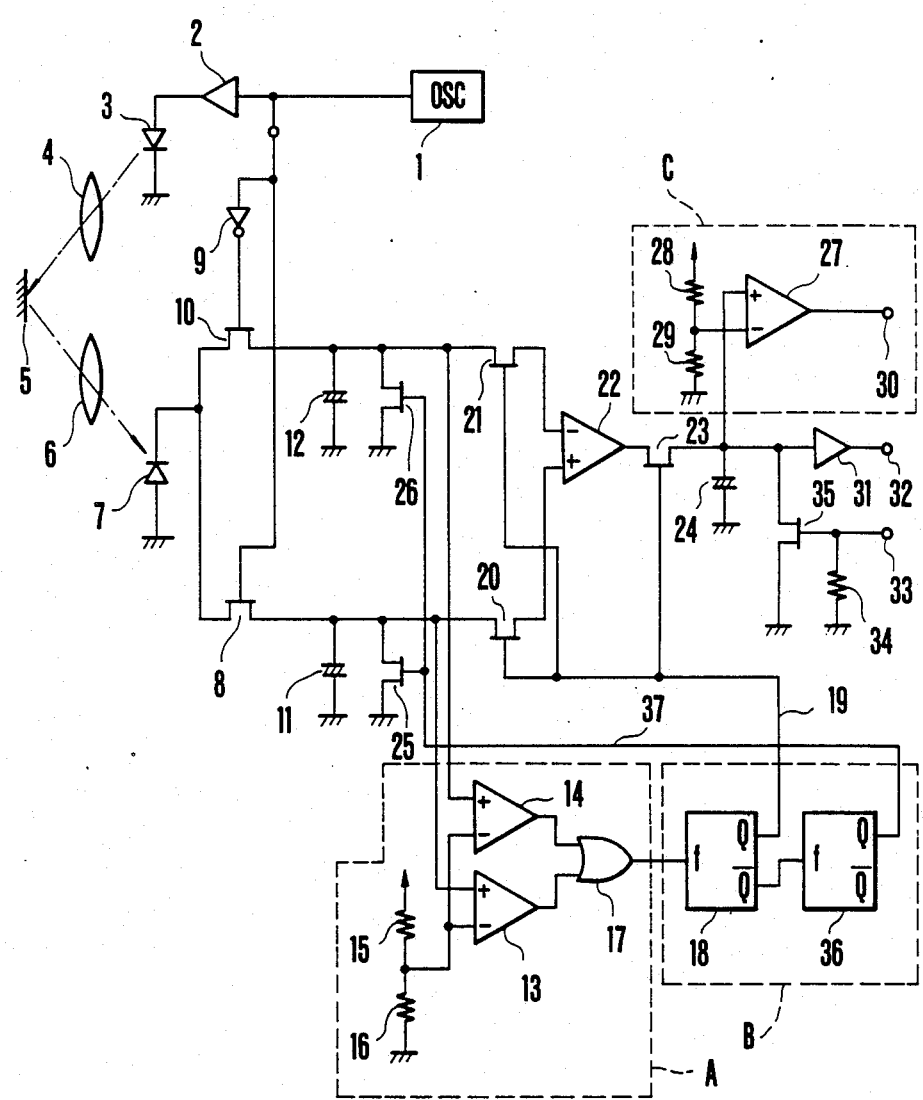

FIG. 1 is a circuit diagram showing a photo-electric converting device in a first embodiment of the invention, while FIGS. 2-5 show modified examples of the first embodiment. Referring to FIG. 1, the embodiment includes a pulse circuit 1 which produces reference pulses; an amplifier 2; and light emitting means 3 such as a light emitting diode or the like. The light emitting means 3 alternately repeats light emitting and no light emitting, depending on a cycle in which high and low level pulse signals are produced from the pulse circuit 1. Reference numeral 4 identifies a light emitting lens and reference numeral 5 identifies a distance measuring object or a photography object when the photo-electric converting device according to the invention is to be used for a photographic camera. A light receiving lens 6 receives reflected light from the object 5. A photo-electric converting part 7 photo-electrically converts the reflected light received from the object 5. The photo-electric converting part 7 receives and photo-electrically converts reflected light including a light component resulting from light projection performed by the light emitting means 3 and another light component resulting from ambient light, such as sunlight or indoor illuminated light, etc. other than the light emitted from the light emitting means 3 during a time when the light emitting means 3 is light emitting, i.e. when the pulse circuit OSC1 produces a high level pulse signal (hereinafter called H level signal). When the light emitting means 3 is not light emitting, i.e. when the pulse signal produced from the pulse circuit OSC1 is at a low level (hereinafter called L level), the photo-electric converting part 7 receives and photo-electrically currents reflected light resulting solely from ambient light.

A first electric charge storing part 11 is provided with an input gate 8 and a second electric charge storing part 12 with an input gate 10. When the pulse circuit (OSC) 1 is producing an H level signal, an electric charge produced by photo-electric conversion at the photo-electric converting part 7 comes via the input gate 8 and is stored by the electric charge storing part 11. When the pulse circuit (OSC) 1 is producing an L level signal, an electric charge produced at the photo-electric converting part 7 by photo-electric converting incident light resulting solely from ambient light comes via the input gate 10 to be stored by the second electric charge storing part 12. An inverter 9 renders the input gate 10 operative when the pulse signal produced from the pulse circuit (OSC) 1 is at an L level. In the light incident on the photo-electric converting part 7, if the quantity of the ambient light component is greater than that of the projected light component emitted from the light emitting means 3, the difference between signal values produced from the first and second electric charge storing parts 11 and 12 becomes small, making it insufficient for use as a control signal for distance measurement. Therefore, in that event, the control signal tends to result in an erroneous distance measuring operation. Furthermore, there is the possibility that the storing parts 11, 12 might be saturated before an output difference is obtained from the first and second electric charge storing parts 11, 12.

In FIG. 1, a block A represents an electric charge storing level detecting part which detects whether or not stored voltage signals produced from the first and second storing parts 11, 12 have reached a predetermined level. The electric charge storing level detecting part A comprises two comparators 13 and 14 which receive the signals produced from the first and second electric charge storing parts 11 and 12 and a reference voltage signal obtained through voltage division by resistors 15 and 16; and an OR gate 17 which connects the output terminals of the comparators 13 and 14. A block B represents a gate control circuit which allows the operation of the photo-electric converting device to proceed to the next step of computation based on a signal produced from the above electric charge storing level detecting part A. The gate control circuit B comprises monostable multivibrators 18 and 36. Input gates 20 and 21 control the supply of the storage signals of the first and second storing parts 11 and 12 to the input terminals of a differential amplifier 22. A gate 23 allows a signal produced from the differential amplifier 22 to be supplied to a capacitor or storing means 24 which stores information. A block C represents determining means which is provided for the above capacitor or storing means 24 and consists of resistors 28 and 29 and a comparator 27. The circuit, which is arranged as shown in FIG. 1, operates as follows:

The electric charges of the photo-electric converting part 7 are stored 7 at the storing parts 11 and 12 through the gate 8 which opens at the time of light projection or emission and the gate 10 which is opened by the inversion signal of the inverter 9 when no light is projected.

The difference between the electric charges (voltages) stored by the two storing parts 11, 12 represents a reflection light component resulting from light projection performed by the light emitting means 3. However, the value of this difference is small compared to the stored electric charges, that is, when the external or ambient light component is large, the storing parts 11, 12 tend to saturate before a sufficient difference in output is obtained. To solve this problem, the stored electric charges are compared respectively by the comparators 13 and 14 with the reference voltage obtained through the resistors 15 and 16. Then, arrival of the output of either one of the storing parts 11, 12 at a predetermined level is detected through the output of an OR gate. The monostable multivibrator 18 is then actuated by a rising signal produced from the OR gate. The monostable multivibrator 18 then produces from its Q output terminal a high level signal of fixed width to a line 19. The line 19 then opens the gates 20 and 21, supplying the stored voltage to the differential amplifier 22. The computation output of the amplifier 22 is stored at the storage means 24 via a gate 23, which is opened by the signal line 19 of the gate control circuit B simultaneously with the gates 20 and 21. This arrangement permits accurate detection of the above weak difference signal by internally storing, so to speak, an alternating current like difference regardless of a drift over a long period of time.

For this purpose, the comparators 13 and 14 must have some input functions that are not affected by the stored electric charges for level determination. However, the differential amplifier 22 does not have to destroy information. After the differential amplifier 22 output is produced, a monostable multivibrator 36 is actuated by the rise of the $\overline{Q}$ output of the monostable multivibrator 18. Then, a pulse of fixed width is produced from the Q output terminal of the monostable multivibrator 36 to a line 37. This pulse opens gates 25 and 26 to allow the electric charges stored at the storing parts 11 and 12 to flow out or to be cleared for a next storing operation.

The reflected light component resulting solely from light emission by the light emitting means 3 is thus alone stored at the storage part 24. Then, arrival of the stored reflected light component at a sufficient signal level is determined by a comparator 27 which compares it with a reference voltage obtained through resistors 28 and 29. The comparator 27 then produces its output to a terminal 30. Furthermore, the storage signal is produced from an amplifier 31 to a terminal 32. A terminal 33 has a gate 35 opened by a high level signal which is against the action of a pull down resistor 34 and thus allows the storage signal electric charge to flow out or to be cleared.

The reflected light which includes the external light therein is thus measured with a high S/N ratio in a synchronized integrating manner during a period of time before the terminal 30 level becomes high after the voltage change of the terminal 32 or clearing by the terminal 33.

The photo-electric converting element consists of the photo-electric converting parts 7, gates 8, 10, comparators 13, 14 and one differential amplifier 22 and can be within a single IC according to the structural arrangement of CCD or MOS. Therefore, a synchronized differential output with a high S/N ratio can be obtained.

In carrying out the difference computation and the storage clearing process in the embodiment described above, the pulse circuit or oscillator OSC1 is reset to inhibit the operation of the inverter 9. This arrangement permits photo-electric conversion with the reactive time eliminated during the above time period. Furthermore, it is also possible to save electric energy by varying the light projecting electric energy based on the stored quantity of the electric charge difference. It is also possible to arrange a plurality of photo-electric converting units and to remove the difference between the outputs of these units.

It goes without saying that the photo-electric converting element 7 according to this invention is applicable not only to the optical system shown in FIG. 1 but also to the optical system of a single-lens reflex camera and to those of video cameras and TV cameras. Furthermore, use of the photo-electric converting device for so-called automatic focusing arrangements to detect an object distance by receiving reflected light from the object also permits a highly accurate automatic focusing operation.

As described in the foregoing, a photo-electric converting element 7 which is capable of performing detection with a high S/N ratio and wide external-light dynamic range by virtue of the processes of synchronized selective integration and integration of a difference obtained through repeated performances thereof, can be readily arranged in one chip.

Figure 2:
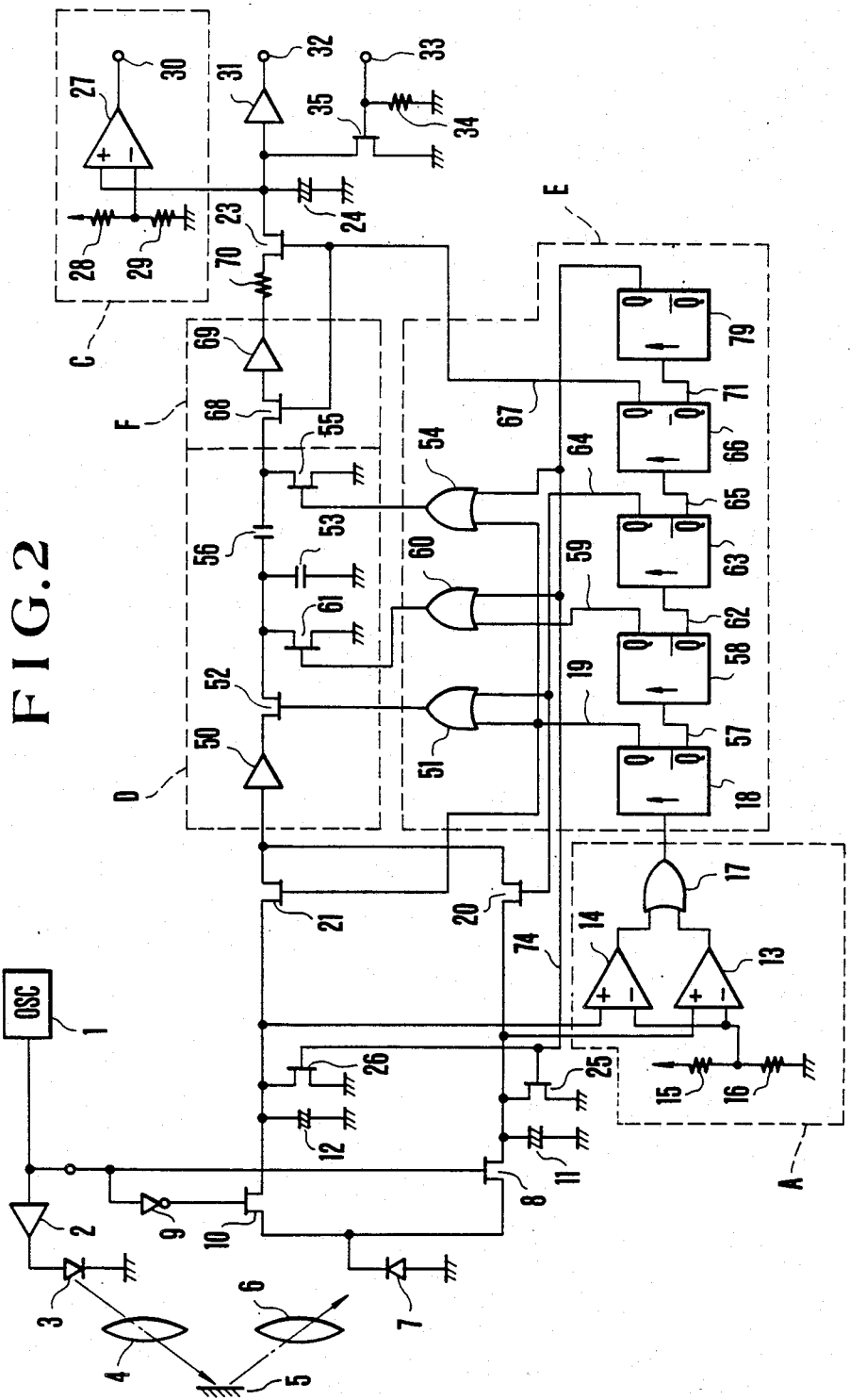

FIG. 2 shows another embodiment of the invention. In FIG. 2, the same reference symbols and numerals as those used in FIG. 1 identify the circuits and elements performing the same functions as those of FIG. 1. In this embodiment, the photo-electric converted signal representing reflected light received at the light emission times by the light emitting means 3 and the photo-electric converted signal representing reflected light received when no light is emitted by the light emitting means 3 are respectively stored at the first and second storing parts 11, 12. Then, before these stored electric charge signals are guided to the computing part, they are stored at a memory part and the reflected light quantity obtained at the time of the light emission is detected from signals stored at the memory part. The operation of the circuit of FIG. 2 is as follows:

With the light emitting means 3 performing the light emitting and no light emitting operation, reflected light resulting from light emission and ambient light are received by the photo-electric converting part 7, one after another. The incident light thus obtained is photo-electrically converted and is stored via the gates 8 and 10 at the first and second electric charge storing parts 11 and 12. The difference between the electric charges (voltages) stored at the storing parts 11 and 12 represents a reflected light component resulting solely from light emission or projection. However, if this difference is too small as compared with the stored electric charges, i.e. when the external light component is large, the storing parts 11, 12 would become saturated before a sufficient output difference is obtained. To solve this problem, the stored electric charge quantity is detected by means of a stored electric charge level detecting part A. In this stored electric charge level detecting part A, the comparators 13 and 14 compare the stored electric charges with a reference voltage obtained via the resistors 15 and 16. Then, when either of the stored electric charges reaches a predetermined level it is detected by the output of an OR gate. A rising signal thus produced from the OR gate is supplied to a gate control part E. The gate control part E comprises monostable multivibrators 18, 58, 63, 66 and 79 which are in multiple stages. Output signals 19, 59, 64, 67 and 74 of the gate control part E control the output gates 20 and 21 and the gates 25 and 26 of the above electric charge storing parts 11 and 12, gates 52, 61 and 55 of a memory part D and gates 23 and 68 of a computing part F. In the gate control part E, the monostable multivibrator 18 is actuated by the output signal of the above level detecting part A. A high level signal of fixed width is then produced from the Q output terminal of the element 18 to the signal line 19. This signal opens the gate 21 amplifying the electric charge stored at the storing part 12 by an amplifier 50. The high level signal of the line 19 also opens the gate 52 via an OR gate 51, the output level of which becomes high by the high level signal of the line 19. With the gate 52 thus opened, the above electric charge voltage is supplied to a first memory part 53. Meanwhile, another OR gate 54, the output level of which likewise becomes high, then opens the gate 55. With the gate 55 thus opened, the electric charge voltage is also stored at a second memory part 56.

When the level of the line 19 becomes low, that of a line 57 becomes high, actuating the monostable multivibrator 58. Then, a high level signal of fixed width is supplied to a line 59. This opens the gate 61 via an OR gate 60. With the gate 61 open, the electric charge voltage stored at the first memory part 53 is cleared. When the level of the line 59 drops and that of a line 62 rises, the monostable multivibrator 53 becomes operative, producing a high level signal of fixed width to a signal line 64. This signal opens the gate 20 simplifying the electric charge stored at the first electric charge storing part 11 by the amplifier 50. Meanwhile, the gate 52 is also opened by an OR gate 51 the output level of which becomes high by the high level signal of the line 64. With this gate 52 open, the electric charge voltage mentioned above is supplied to the first memory part 53. As a result, the first memory part 53 stores the voltage which has been stored at the electric charge storing part 11 as the sum of an external and a reflected light. Meanwhile, the second memory part 56 stores the stored voltage of the storing part 12, representing the external light quantity on the side of the amplifier 50.

Then, when the level of the line 64 drops and that of another line 65 rises, the monostable multivibrator 66 becomes operative and produces a high level signal of fixed width to a line 67. The high level signal of the line 67 opens the gates 68 and 23. An amplifier 69 converts the input voltage thereof into a current (an electric charge) via a resistor 70 and stores it at the third storage part 24. At that time, the input voltage consists of the voltages of a series of the first and second memory parts 53 and 56 and, therefore, represents the reflected light quantity (external light+reflected light quantity−external light).

When the level of the line 67 drops and that of another line 71 rises, a monostable multivibrator 79 becomes operative, producing a pulse signal of fixed width from its Q output terminal to the line 74. This pulse signal opens gates 25 and 26. With these gates 25, 26 open, the electric charges stored at the storing parts 11 and 12 flow out (or are cleared) for the next storing process. Concurrently, the contents of the memory parts 53 and 56 are also cleared with gates 61 and 55 opened via OR gates 60 and 54.

Through these processes, it is only the reflected light component resulting from light projection by the light emitting means 3 that is stored by the storing part 24. The stored level of the reflected light component is compared by the comparator 27 with the reference voltage obtained via the resistors 28 and 29. The comparator 27 produces a storage signal at the terminal 30 when the stored level reaches a sufficient signal level. Then, the storage signal is also produced from the amplifier 31 to the terminal 32. The terminal 33 opens a gate 35 by a high level signal coming against the action of the pull down resistor 34, allowing this storage signal electric charge to flow out (to be cleared).

The reflected light, which is thus mixed in an external light, can be measured with a high S/N ratio in a synchronized integrating manner during a period of time before level the terminal 30, becomes high, after the voltage of the terminal 32 changes or that of the terminal 33 is cleared. Since the photo-electric converting element is composed of the photo-electric converting part 7, gates and amplifiers, it can be easily arranged within a single piece of IC depending on the structure of a CCD or MOS and yet a synchronized differential output can be obtained with a high S/N ratio. In the embodiment described, photo-electric conversion can be accomplished with a reactive time excluded during the above period time an by arrangement in which the oscillator OSC1 rest, inhibiting the operation of the inverter 9 during the difference computation and storage clearing processes. It is also possible to save electrical energy by varying the light projecting electric energy based on to the stored quantity of the electric charge representing the difference. Furthermore, it is also possible to arrange a plurality of photo-electric converting units and to obtain only the difference between their outputs.

Figure 3:
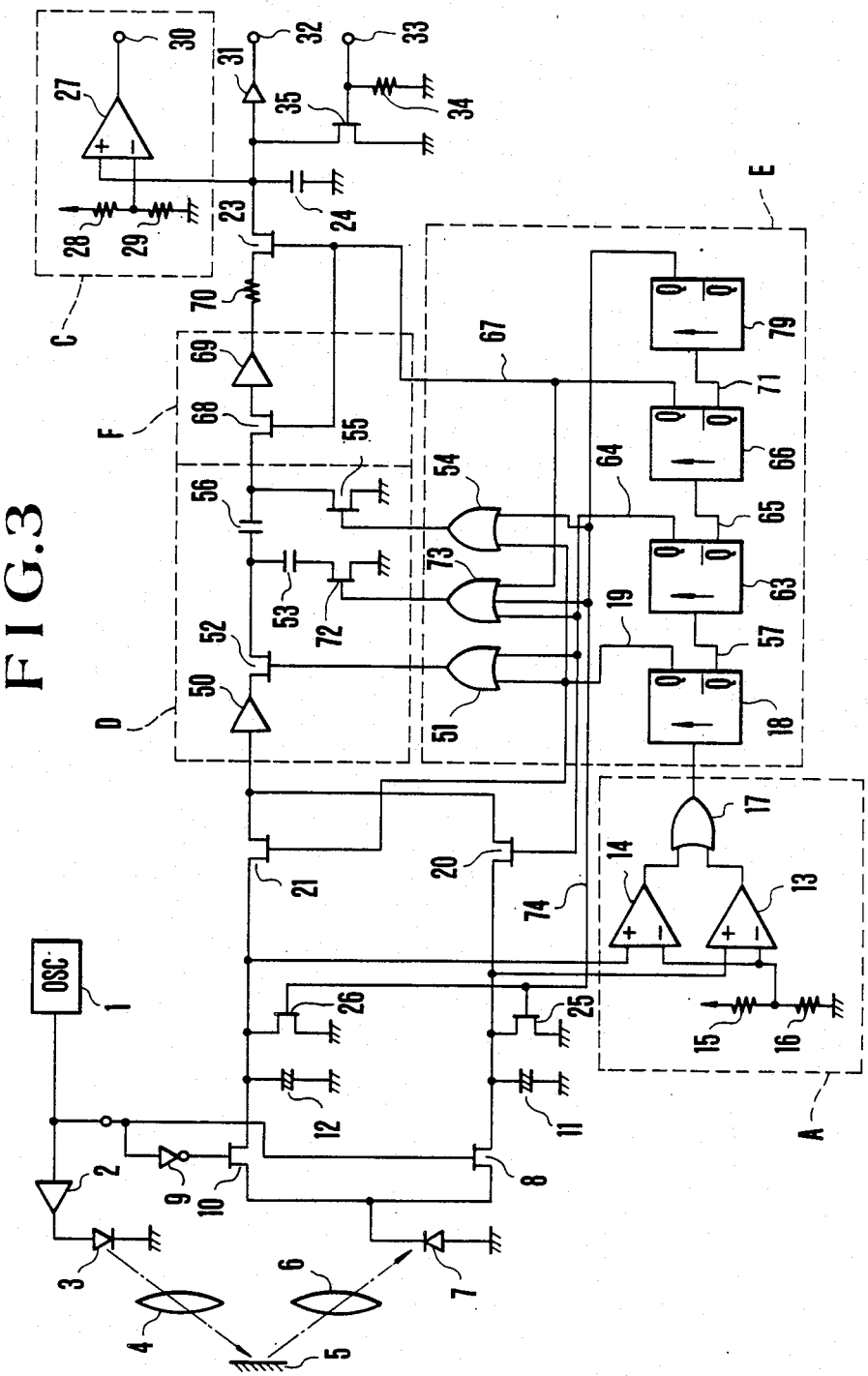

Another embodiment of the invention is arranged as shown in FIG. 3. In FIG. 2, the stored voltage of the first memory part 53 is cleared. In the embodiment shown in FIG. 3, however, the memory part 53 is operated in a floating manner via a gate 72, which is controlled via an OR gate 73 in such a way as to be opened when it receives the electric charge stored at the storing part 11, of computation read-out and at the time total clearing.

Figure 4:
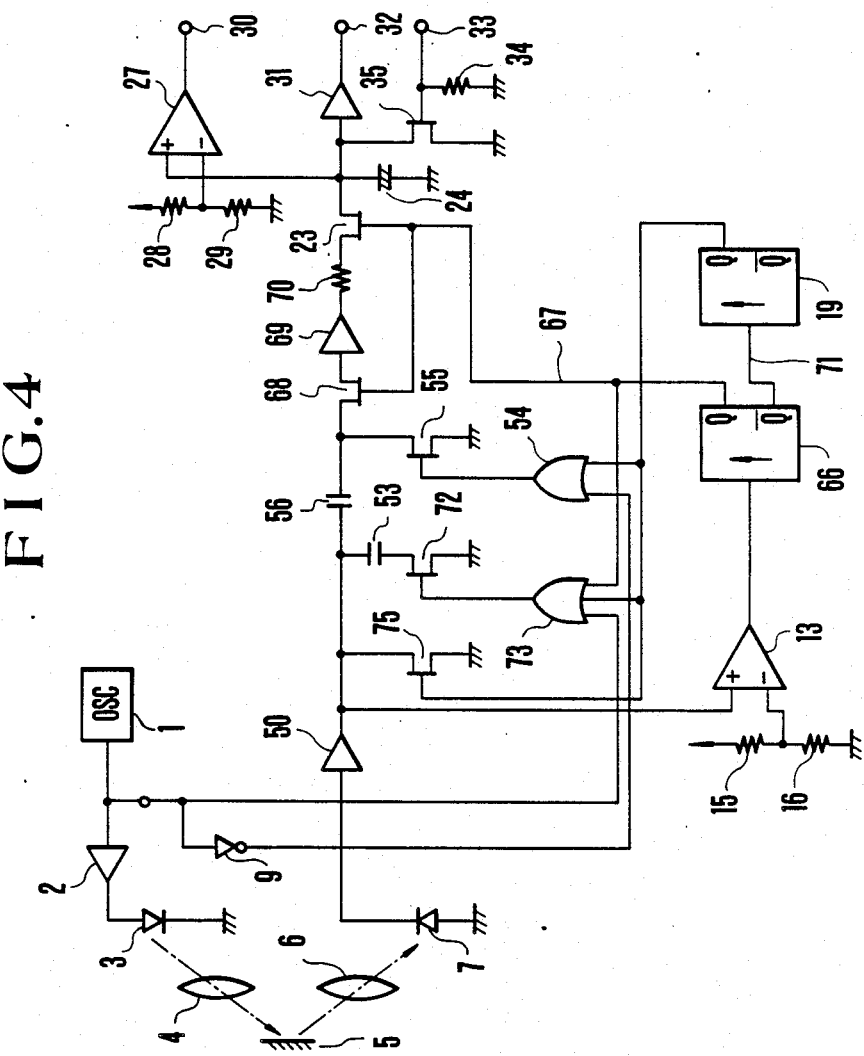

FIG. 4 shows a further embodiment. In this case, the first and second memory parts 53 and 56 of FIG. 2 directly store the photo-electrically converted electric charges. More specifically, these electric charges are selectively stored by the first and second memory parts 53 and 56 in a repeating manner during the light projecting and no light projecting operations of the light emitting means 3 through the OR gates 73 and the 54 and gates 72 and 55. In this instance, the stored voltages which are alternately produced are compared by the comparator 13. Before saturation, the monostable multivibrator 66 is actuated. Then, in the same manner as in FIG. 2, the difference information thus obtained is alone stored at the storage or memory part 24. Then the monostable multivibrator 19 is actuated to clear the electric charges stored at the memory parts 53 and 56 via the OR gates 54 and 73 and gates 75, 53 and the 55.

Figure 5:
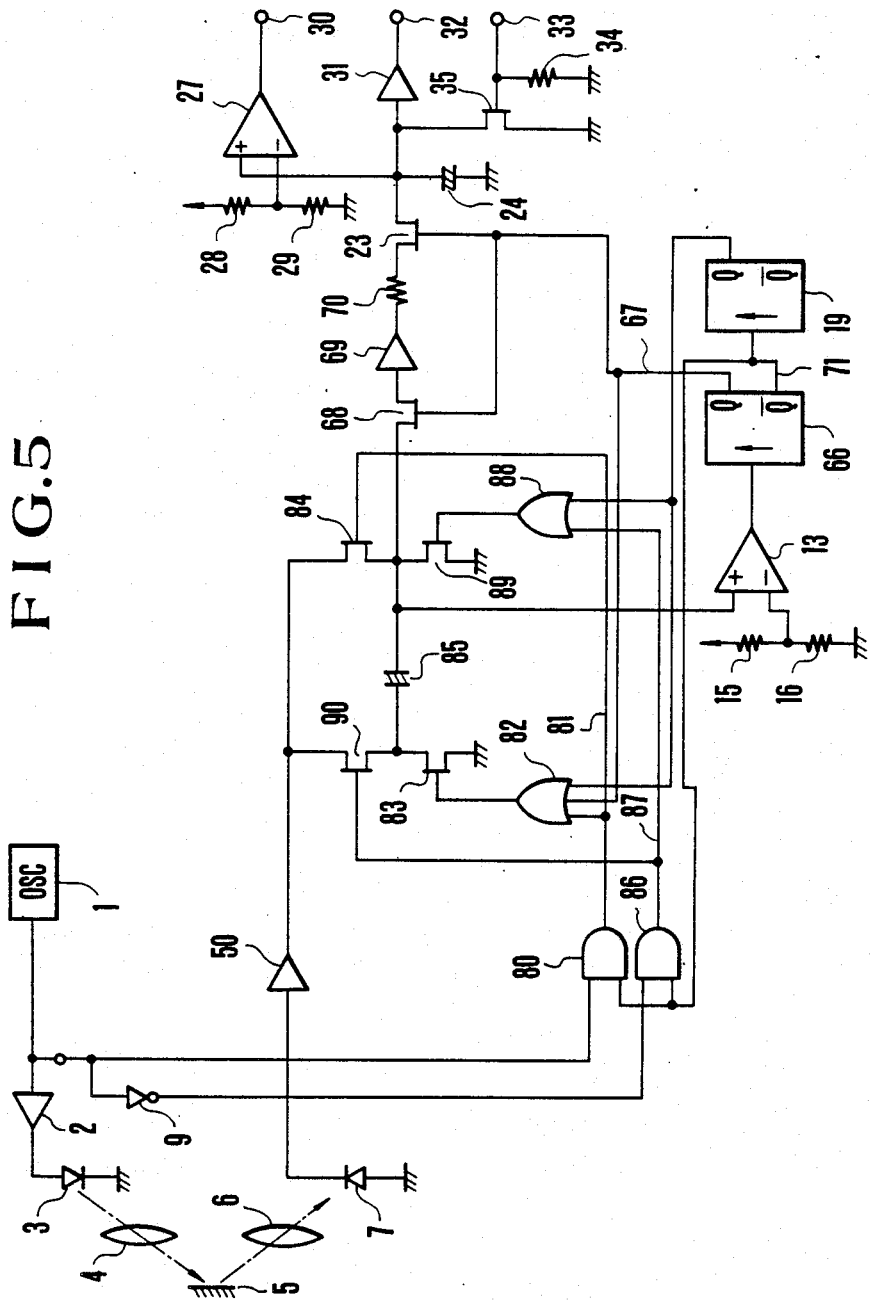

FIG. 5 shows a further embodiment in which errors are reduced by use of a single storing part. At the time of light projection, a high level signal is produced via an AND gate 80 to a signal line 81 except for a read-out operation. This high level signal comes via an OR gate 82 and opens gates 83 and 84, causing a photo-electric converted electric charge which is obtained during light projection and is stored on the right hand side of a storage part 85. When no light is being projected, a high level signal is produced via an AND gate 86 to a signal line 87 except for read-out operation. The high level signal thus produced, via an OR gate 88, opens gates 89 and 90 to cause a photo-electric converted electric charge obtained when no light is being projected to be stored on the left hand side of the storage part 85. Saturation of this storage part 85 takes place during the time of light projection. Therefore, the potential of the storage part 85 is compared by the comparator 13. The output of the comparator 13 then renders the monostable multivibrator 66 operative, integrating difference information alone at the memory part 24. More specifically, the AND gates 80 and 86 are closed by a low level of the line 71. A high level of the line 67, via the OR gate 82, opens the gate 83. With the gate 83 thus opened, the reflected light component stored at the storage part 85 is alone integrated at the memory part 24 by the amplifier 69. Next, the monostable multivibrator 19 becomes operative and opens the gates 83 and 89 via the OR gates 82 and 88. With these gates 83, 89 open, the electric charges stored at the storage part 85 are cleared. The gate operation and the storing operation described above can be accomplished in the same manner when potentials within a semiconductor are used.

Another group of embodiments of this invention are shown in FIGS. 6(a) through 11. The photo-electric converting device in these cases is of the differential type which comprises first and second photo-electric converting parts which receive reflected light from the object 5 and vary their electric charge quantity with the quantity of light thus received. First and second electric charge storing parts 11, 12 store the electric charges produced by the first and second photo-electric converting parts during a period of time when a light is projected from light emitting means. Third and fourth electric charge storing parts store the electric charges produced by the first and second photo-electric converting parts during a predetermined time period of when no light is projected from the light emitting means 3. A difference between the values of electric charges stored at the first and third electric charge storing parts and a difference between the values of electric charges stored at the second and fourth electric charge storing parts are computed through electric charge storing means and gate means. The photo-electric converting device excels in signal read-out characteristics and gives a signal with a high S/N ratio. With the device applied to a distance measuring system, it gives a satisfactory output signal.

Figure 6A:
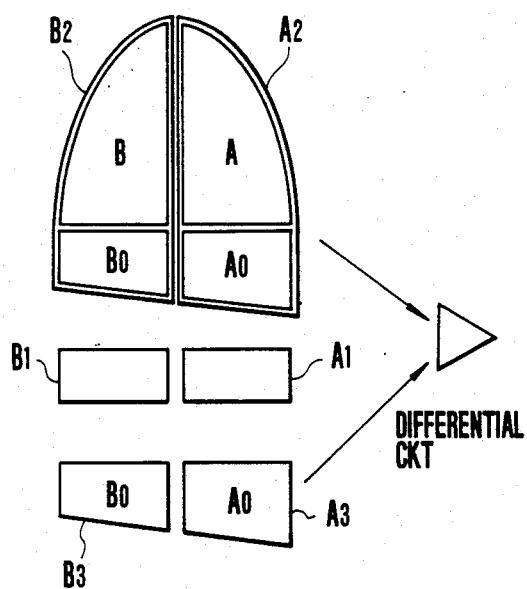
Figure 6B:
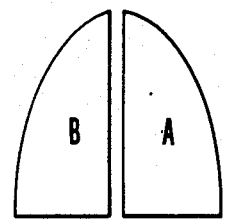
Figure 6C:
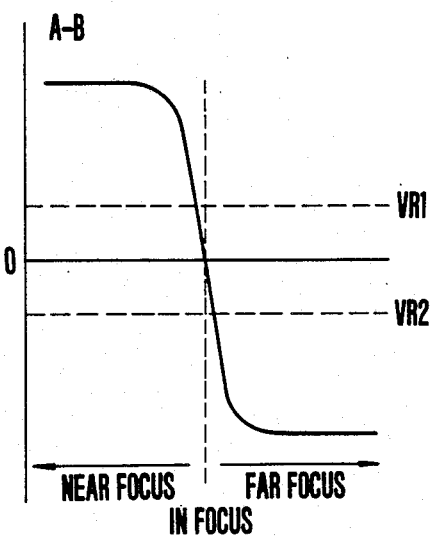

FIGS. 6(a), 6(b) and 6(c) illustrate a differential type photo-electric converting means employed in a differential type sensor device. Referring to FIG. 6(a), when a light is projected from a light source, reflected light from an object to be photographed causes two photo-electric converting parts A1 and B1 to produce electric charge quantities A and B. When the light projecting operation stops, ambient light causes the photo-electric converting parts A1 and B1 to produce electric charge quantities A0 and B0, as conceptionally shown in FIG. 6(a). A sum of electric charges A+A0 and another sum of electric charges B+B0 are obtained from the photo-electric converting parts A1 and B1 and are stored respectively at first and second electric charge storing parts A2 and B2. At the time when no light is projected, the electric charges A0 and B0 produced at the photo-electric converting parts A1 and B1 are stored respectively at third and fourth electric charge storing parts A3 and B3. The difference between these stored electric charges A0 and B0 is obtained by a differential circuit which is arranged based on the present invention. As a result, only the electric charge quantities A and B corresponding to the reflection light component resulting from light projection are detected, as shown in FIG. 6(b). Referring to FIG. 6(c), when the electric charge quantities A and B are equal, the lens 4 of a distance detecting system, for example, is in-focus. In the event that A>B, the lens is considered to be in a near-focus condition. If A<B, the lens 6 is in a far-focus condition. In this instance, this arrangement which keeps the electric charge quantity value stable is preferable for constant focusing accuracy, since results in a nearly constant slant in the proximity of an in-focus position of A−B.

Figure 7:
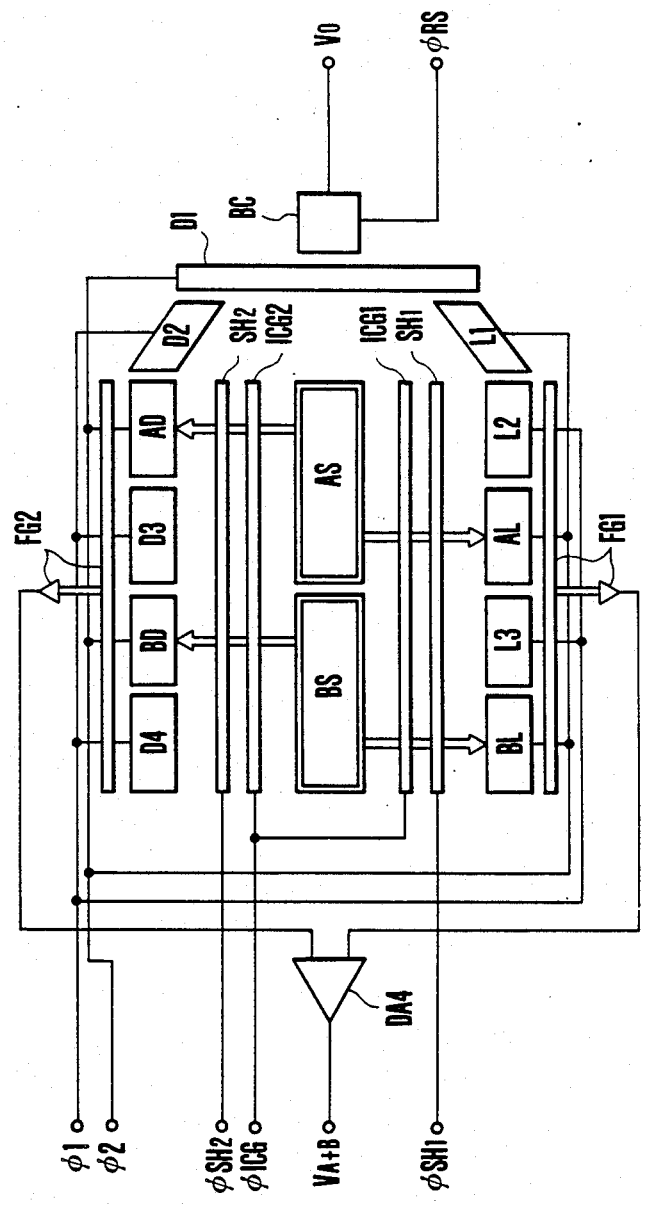

FIG. 7 shows an example of the photo-electric converting part of photo-electric converting means to be used in a differential type sensor device. This example includes first and second photo-electric converting parts AS and BS; first and second electric charge storing parts AL and BL which store the sum of reflected light resulting from light projection and ambient light received when a light is projected; third and fourth electric charge storing parts AD and BD which store the ambient light when no light is projected; integration clear gates ICG1 and ICG2 which clear electric charges produced by the photo-electric converting parts AS and BS when a signal $\phi$ICG is at a high level; electric charge transfer gates SH1 and SH2 which store the electric charges produced from the photo-electric converting parts AS and BS at the electric charge storing parts AL and BL when a signal $\phi$SH1 is at a high level and which store them at the electric charge storing parts AD and BD when a signal $\phi$SH2 is at a high level; and elements D1–D4 and L1–L3 which constitute an electric charge transfer part. The electric charge transfer part D1–D4, L1–L3 transfers the electric charges stored at the electric charge storing parts AL, BL, AD and BD to an electric charge-to-voltage converting part BC in accordance with clock pulses $\phi$ and $\phi$2 for signal read-out. The electric charges (A+A0)+(B+B0) and A0+B0 stored at the electric charge storing parts AL, BL, AD and BD are nondestructively read out via floating gates FG1 and FG2. Then a signal VA+B, which can be expressed as (A+A0)+(B+B0)−(A0+B0)=A+B, can be obtained via a differential amplifier circuit DA4. A signal read-out operation is performed when this output VA+B reaches a reference value.

Figure 8A:
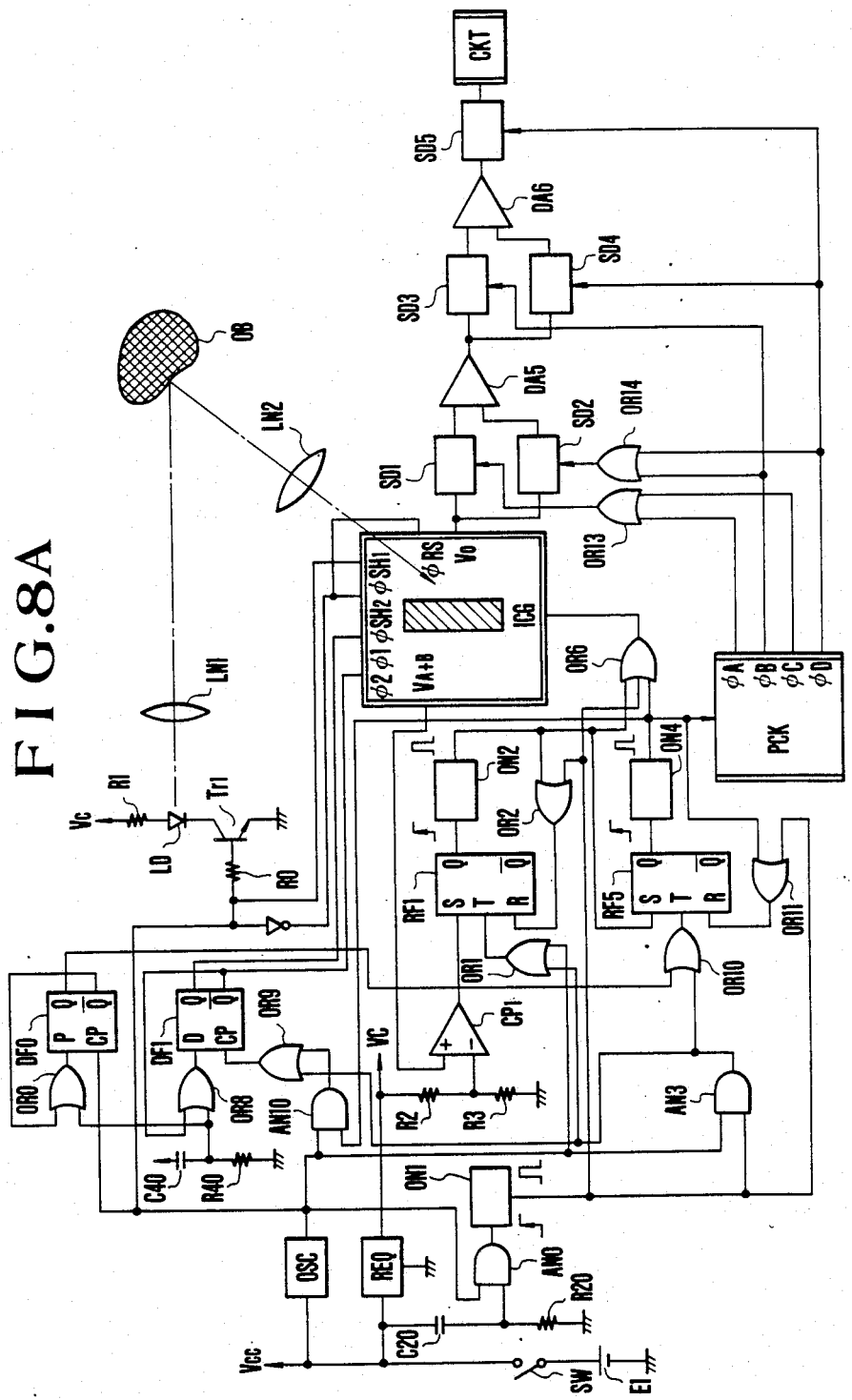

FIG. 8A shows, by way of example, an electric circuit for driving the photo-electric converting means. FIG. 9 is a timing chart showing the operations of the essential parts of FIG. 8A.

Figure 8B:
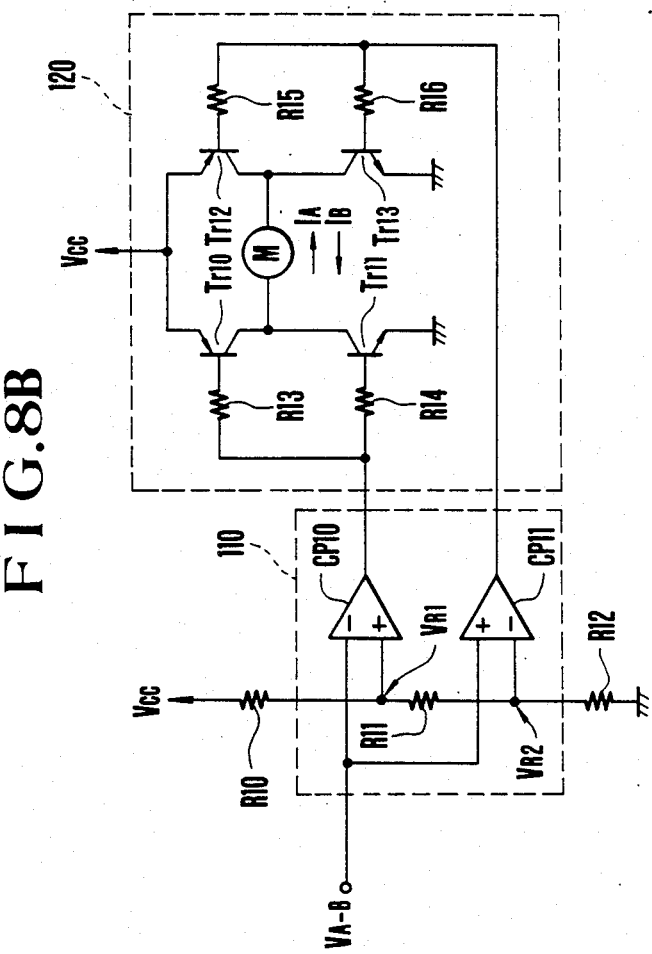
FIG. 8B is a circuit diagram showing a focus control circuit.

When a power supply switch SW turns on at a point of time t0, power supply E1 is impressed on each of the applicable circuit elements. The oscillator OSC1 begins to oscillate. A constant voltage source REQ produces an output. Then, in synchronization with the rising pulse of the oscillator OSC1, the output of an AND gate AND changes to a high level and remains at the high level for a short period of time, determined by a capacitor C20 and a resistor R20. This high level output of the AND gate AND causes a one-shot circuit ON1 to produce a one-shot pulse to clear thereby unnecessary electric charges remaining at the photo-electric converting parts of the storage type photo-electric converting element via an OR gate OR6 during a period between time points t0 and t2. During this period, RST flip-flops RF1 and RF5 are reset. Furthermore, during a short period of time determined by a capacitor C40 and a resistor R40, a D flip-flop DF1 is initially set via an AND gate AN3 and OR gates OR8 and OR9 in synchronization with the rising pulse of the oscillator OSC1. Then, the pulses from the oscillator OSC1 are frequency divided to produce clock pulses $\phi 1$ and $\phi 2$. With the production of these clock pulses, unnecessary electric charges remaining within the electric charge storing parts and the transfer part are cleared. A high level pulse signal produced from the oscillator OSC1 turns on a transistor Tr1. With the transistor Tr1 on, a current restricted by a resistor R1 lights up a light emitting element LD. A light is projected via a light projecting lens LN1 on an object OB to be photographed. The object OB reflects the light. The reflected light is imaged via a light receiving lens LN2 on the photo-electric converting element. In this instance, if the image of the reflection light is formed in the median between the adjoining photo-electric converting parts AS and BS, the outputs of these parts AS and BS become equal and then a distance detecting system, for example, detects that a photo-taking lens is in-focus. When the output level of the one-shot circuit ON1 changes to a low level at the point of time t2, the electric charges of reflected light resulting from light projection are stored at the electric charge storing parts AL and BL when the output of the oscillator OSC1 is at a high level. Alternating with this, the electric charges corresponding to reflected light received when no light is projected is stored at the electric charge storing parts AD and BD when the output level of the oscillator OSC1 is low. At the same time, the AND gate AN3 output level changes to a low level to cut off pulse supply to the flip-flop DF1. The signal $\phi 2$ is then held at a high level and the signal $\phi 1$ at a low level, allowing storage of the electric charges. When the signal VA+B exceeds at a point of time t3 a reference voltage determined by resistors R2 and R3, the output level of a comparator CP1 becomes high. At a point of time t4, therefore, the RST flip-flop RF1 is set via OR gate OR1 in synchronization with the rise of a pulse produced from the oscillator OSC1. Then, the one-shot circuit ON2 produces a one-shot pulse, making the level of the signal $\phi$ICG high. The high level signal $\phi$ICG then brings the image information storing operation of the storage type photo-electric converting means to an end. At a point of time t5, a flip-flop RF5 is set in synchronization with the rise of the Q output of a flip-flop DF0. A one-shot circuit ON4 produces a one-shot pulse. The pulse is supplied via an AND gate AN10 to the flip-flop DF1. The signals $\phi 1$ and $\phi 2$ are driven on and off to allow the stored image information to be read out. Synchronized with the output rise of the one-shot circuit ON4, a pulse control circuit PCK is driven. When a pulse $\phi A$ is produced at a point of time tA, information VAD (A0), which has been stored at the storing part AD, is read out by a sample-and-hold circuit SD1. When a pulse $\phi B$ is produced at a point of time tB, information VAL stored at the storing part AL is read out and supplied via a differential amplification circuit DA5 to a sample-and-hold circuit SD3. Thus, information VAL−VAD is held at the sample-and-hold circuit SD3. When a pulse $\phi C$ is produced at a point of time tC, the information VBD, which has been stored at the storing part BD, is read out and supplied to a sample-and-hold circuit SD1. Another pulse $\phi D$ is produced at a time point tD. Then, information VBL which has been stored at the storing part BL is read out and supplied to a sample-and-hold circuit SD2. Then, through the differential amplification circuit DA5, information VBL−VBD is supplied and held at a sample-and-hold circuit SD4. Concurrently, information (VAL−VAD)−(VBL−VBD) is detected and held at a sample-and-hold circuit SD5 through a differential amplification circuit DA6. Then, the photo-taking lens 6 is driven to an in-focus position via a control circuit CKT based on this information. After each sampling-and-holding operation, the level of a signal $\phi$RS becomes high to clear the image information supplied to the electric charge-to-voltage converting part at a point of time t6. At the time point of t6, the flip-flop RF5 is reset in synchronization with the rise of the Q output level of the flip-flop DF0. After that, the same operation as that performed during the period between the time points t0 and t6 is repeated. The control circuit mentioned above is arranged as shown in FIG. 8B. Referring to FIG. 8B, a block 110 represents a window comparator which operates according to the above signal VA−B. A block 120 represents a motor drive circuit. Referred symbol M identifies a motor. The motor M is connected to a lens carrying member which is provided for a focusing lens.

In the circuit of FIG. 8B, the lens is in an in-focus position when the value of the signal VA−B is between values VR1 and VR2, shown in the graph of FIG. 6(c). If VA−B>VR1, the motor M is rotated clockwise, for example, bringing the focusing lens to the in-focus zone. If VA−B<VR2, the motor M is rotated, for example, counterclockwise bringing the lens to the in-focus zone. With the signal VA−B being of a value between the values VR1 and VR2, the outputs of comparators CP10 and CP11 become high level signals, turning on only transistors Tr11 and Tr13. The motor M remains stationary leaving the lens within the in-focus zone. When VA−B>VR1, the comparator CP10 produces a level signal and the comparator CP11 a high level signal. Then, transistors Tr10 and Tr13 turn on, causing a current to flow in the direction of IA as shown in the drawing thereby driving the motor M. Under another condition VA−B<VR2, the comparator CP10 produces a high level signal and the other comparator CP11 a low level signal. Transistors Tr11 and Tr12 drive the motor M with a current which flows in the direction of IB as shown in the drawing.

In accordance with the prior art arrangement, computation is accomplished on information which is produced in a time serial manner via sample-and-hold circuits and differential amplification circuits. However, such a circuit arrangement is not only complex but also necessitates use of bipolar transistors and thus can hardly be a single unit with a differential type sensor part.

Whereas, in accordance with this invention, the computation can be accurately accomplished through the electric charge storing means and the gate means with a simple circuit arrangement, which can be in one unit with the differential type sensor.

Figure 10:
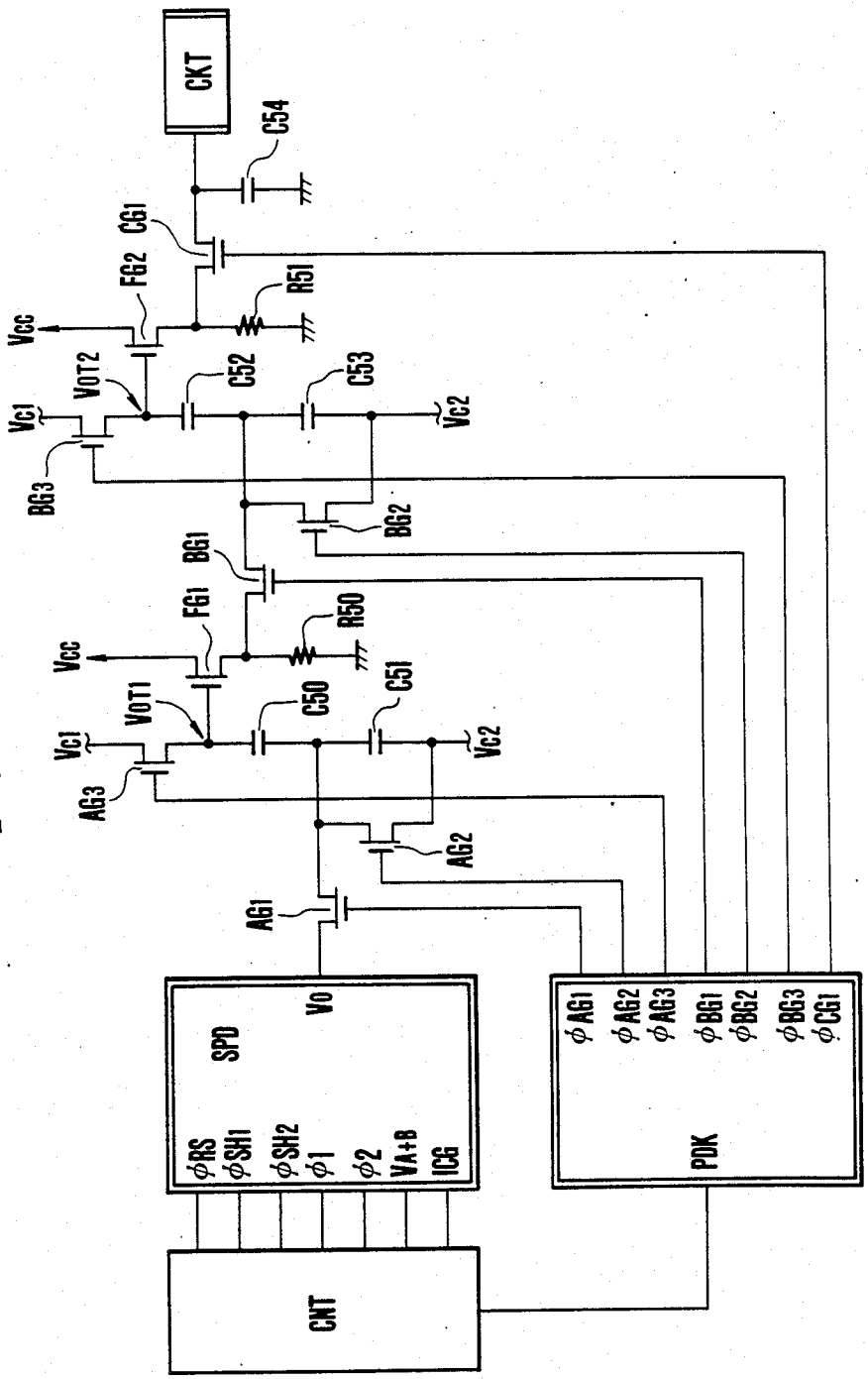

FIG. 10 shows an electric circuit in another embodiment of the invention. The embodiment includes a driving circuit CNT which drives the photo-electric converting means SPD of FIG. 8A; a circuit PDK which corresponds to the pulse control circuit PCK of FIG. 8A and controls gate means AG1—AG3, BG1—BG3 and CG1; electric charge storing means which consists of capacitors C50–C54; field effect type transistors FG1 and FG2 which form a source follower circuit in conjunction with the resistors R50 and R51; and reference voltages VC1 and VC2 which are of suitable values.

Figure 11:
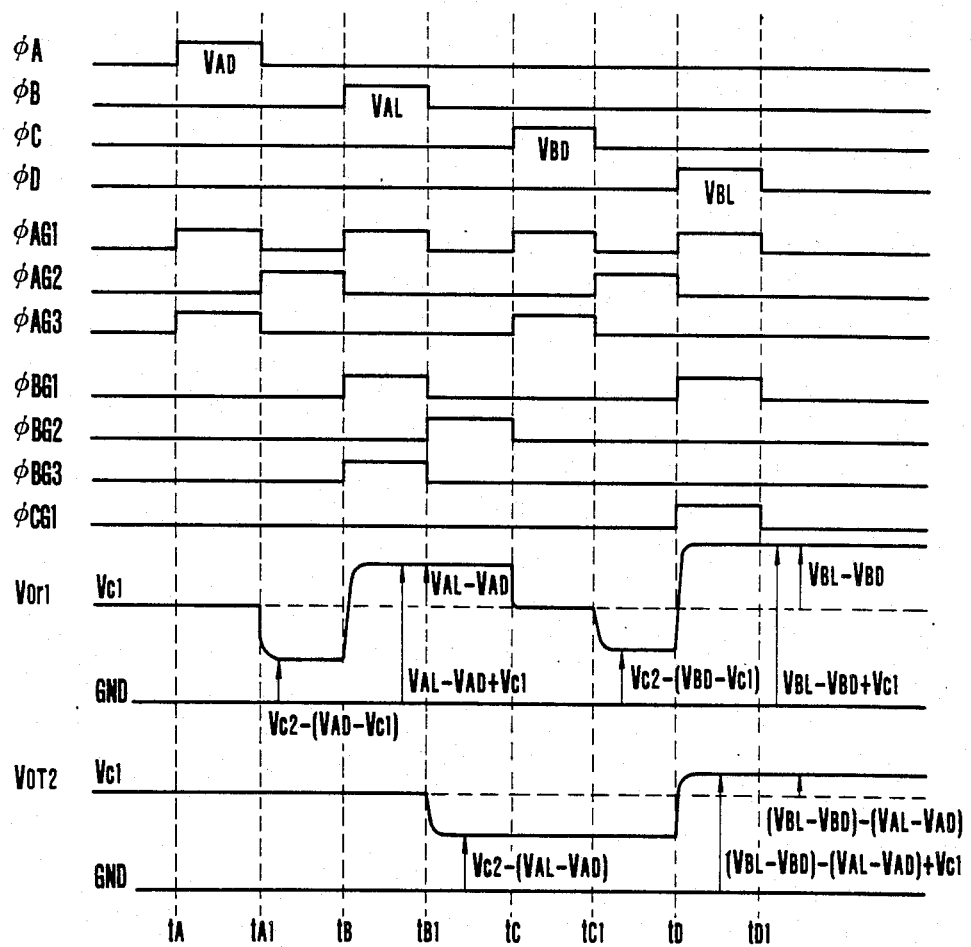

FIG. 11 is a timing chart showing the operation of the essential parts of FIG. 10. Referring to FIG. 11, the electric circuit arrangement of FIG. 10 operates as follows: When information VAD is produced from a terminal Vo at a point of time tA, the analog gates AG1 and AG3 are turned on and another analog gate AG2 is turned off. As a result, voltage information VAD−VC1 is stored at the capacitor C50.

When the analog gates AG1 and AG3 turn off and the analog gate AG2 turns on at a point of time tA1, the output VOT1(A) of a terminal VOT1 becomes $$VOT1(A) = VC2 - (VAD - VC1).$$

When information VAL is produced from the terminal Vo at a point of time tB, the analog gate AG1 turns on and the analog gates AG2 and AG3 turn off. Therefore, voltage information VAL−VC2 is stored at the capacitor C51. At the same time, the output VOT1(B) of the terminal VOT1 becomes $$VOT1(B) = VOT1(A) + VAL - VC2$$
$$= VAL - VAD + VC1$$

and a change takes place as shown in FIG. 11. In other words, the difference between voltage information VAL and VAD is obtained based on the reference voltage VC1.

Furthermore, at the point of time tB, the analog gates BG1 and BG3 turn on and the analog gate BG2 turns off. Therefore, voltage information VAL−VAD is stored at the capacitor C52 via the source follower circuit which is formed by the transistor FG1 and the resistor R50. The offset voltage of the source follower circuit comes as a bias term and is negligible. At a point of time tB1, the analog gate BG2 turns on and the analog gates BG1 and BG3 turn off, causing the output VOT2(B) of a terminal VOT2 to become VOT2(B)=VC2−(VAL−VAD).

When information VBD is produced from the terminal Vo at a point of time tC, the analog gates AG1 and AG3 turn on and the analog gate AG2 turns off, storing the voltage information VBD−VC1 at the capacitor C50. At a point of time tC1, the analog gates AG1 and AG3 turn off and the gate AG2 turns on, causing the output VOT1(C) of the terminal VOT1 to become VOT1(C)=VC2−(VBD−VC1).

When information VBL is produced at a point of time tD, the analog gate AG1 turns on and the gates AG2 and AG3 turn off, voltage information VBL−VC2 is stored at the capacitor C51. At this instant, the output VOT1(D) of the terminal VOT1 becomes:

$$VOT1(D) = VOT1(C) + VBL - VC2$$
$$= VBL - VBD + VC1$$

Since the analog gate BG1 turns on and the gates BG2 and BG3 turn off concurrently, the information VOT1(D) is stored, via a source follower circuit formed by the transistor FG2 and the resistor R51, at the capacitor C53 as voltage information VBL−VBD+VC1−VC2. Concurrently, the output VOT2(D) of a terminal VOT2 becomes:

$$VOT2(D) = VOT2(B) + VBL - VBD + VC1 - VC2$$
$$= (VBL - VBD) - (VAL - VAD) + VC1$$

Therefore, with the reference voltage VC1 used as reference, it is possible to obtain the difference between a true projected light signal of a sensor part B which is obtained by subtracting an ambient light signal obtained under a no light projecting condition from a sum signal consisting of a projected light signal and an ambient light signal and another true projected light signal of another sensor part A, which is likewise obtained by subtracting an ambient light signal obtained under a no light projecting condition from a sum signal consisting of a projected light signal and an ambient light signal.

This invention is not limited to the use of a computing circuit with capacitors and gates. The computing circuit, of course, may be arranged in a different manner chosen from many conceivable modifications.

The difference between the true projected light signals of the sensors A and B produced from the terminal VOT2 is supplied via the source follower circuit consisting of the transistor FG2 and the resistor R51 and is sampled and held by the capacitor C54 based on a sample-and-hold pulse signal $\phi$CG1. Then, a focusing operation is carried out by the control circuit CKT based on the difference thus obtained.

The embodiment described above performs voltage computing operation. However, it is apparent that the arrangement according to the invention is not limited to that type of operation but is also applicable to an operation of the electric charge computing type. Furthermore, the arrangement according to the invention is suited for a computing operation on information produced in time series.

As described in the foregoing, in the differential type sensor device according to the invention, the electric charge storing means and the gate means for computation can be arranged according to the process of an MOS. Therefore, in accordance with the invention, adverse noises can be reduced to obtain a focus detecting signal with an excellent S/N ratio by virtue of arranging the computing part as a unit with the differential type sensor part. This is a great advantage of the invention.

What we claim:

1. An information signal processing device for a focus detection device for intermittently projecting a light bundle to an object from light projecting means and detecting light reflected from the object at a time of the light projection, thereby detecting a focusing state or a distance state, comprising:
   (a) a light receiving part for receiving light from the object;
   (b) first storing means for storing an output of the light receiving part at a time of light projection by the light projecting means;
   (c) second storing means for storing an output of the light receiving part at a time no light projection is performed by the light projecting means;
   (d) detecting means for producing an output when a stored value of either said first storing means or said second storing means reaches a predetermined level;

(e) third storing means for forming a signal corresponding to a difference signal between the stored values of the first storing means and of the second storing means in response to the output of said detecting means, and for storing said signal corresponding to the difference signal every time the detecting means produces said output; and (f) initialization means for shifting the stored values of said first and second storing means to their initial state for a short period of time in response to the output of said detecting means, whereby said first and second storing means store the output of the light receiving part from an initial stage until said output from the detecting means is produced, and repeat said storing operation every time said output from the detecting means is produced, and at the same time every time the detecting means produces an output, the difference signal of the values stored by said first and second storing means is stored by said third storing means, thus such information as corresponding to the light reflected from the object due to said light projection is obtained as a stored value of said third storing means.

2. A device according to claim 1, further comprising second detecting means for detecting a value stored by said third storing means and producing an output when said stored value reaches a predetermined level.

3. A device according to claim 1, wherein said first, second and third storing means are capacitors.

4. A device according to claim 1, wherein said information processing device comprises computing means for obtaining a difference of the stored values of said first and second storing means, and said difference signal is supplied to the third storing means every time said detecting means produces an output.

* * * * *